US012519392B2

(12) United States Patent
Naradhipa et al.

(10) Patent No.: US 12,519,392 B2
(45) Date of Patent: Jan. 6, 2026

(54) TRANSIENT CONTROL SCHEME FOR MULTIPHASE POWER CONVERTERS

(71) Applicant: VIRGINIA TECH INTELLECTUAL PROPERTIES, INC., Blacksburg, VA (US)

(72) Inventors: Adhistira Madhyasta Naradhipa, Blacksburg, VA (US); Qiang Li, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 473 days.

(21) Appl. No.: 18/068,144

(22) Filed: Dec. 19, 2022

(65) Prior Publication Data

US 2024/0204652 A1   Jun. 20, 2024

(51) Int. Cl.
*H02M 3/158* (2006.01)
*H02M 3/156* (2006.01)
*H02M 1/00* (2006.01)
*H02M 1/14* (2006.01)
*H02M 3/07* (2006.01)

(52) U.S. Cl.
CPC ....... *H02M 3/1584* (2013.01); *H02M 3/1566* (2021.05); *H02M 3/1586* (2021.05); *H02M 1/0043* (2021.05); *H02M 1/0095* (2021.05); *H02M 1/14* (2013.01); *H02M 3/07* (2013.01)

(58) Field of Classification Search
CPC ............. H02M 3/1584; H02M 3/1566; H02M 3/1586; H02M 3/07; H02M 1/0043; H02M 1/0095; H02M 1/14
See application file for complete search history.

(56) References Cited

U.S. PATENT DOCUMENTS 8,896,278 B2    11/2014  Ouyang et al.
2012/0200274 A1   8/2012  Tang et al.
(Continued)

OTHER PUBLICATIONS

Texas Instruments "TPS53667, D-CAP+, Step-Down, Buck Controller, with NVM and PMBusTM Interface for ASIC Power and High Current Point of Load" Jul. 2016.

*Primary Examiner* — Gary L Laxton
*Assistant Examiner* — Jennifer C Caulk
(74) *Attorney, Agent, or Firm* — Perilla Knox & Hildebrandt LLP; James J. Rha

(57) ABSTRACT

Aspects of a transient control scheme for a multiphase power converter are described. In one example, a power converter system includes a multiphase power converter that includes a plurality of converter phases, with each converter phase comprising a switching transistor and an inductor coupled between an input power source and a load. The power converter system also includes a controller configured to distribute an on-time signal to each converter phase during operation of the multiphase power converter. The controller includes circuitry configured to enable an on-time signal phase overlap between non-subsequent phases of the multiphase power converter when a load current increase is detected during a transient state of the multiphase power converter. The on-time signal phase overlap refers to a simultaneous on-state of two or more switching transistors of the non-subsequent phases during a duration of time within the transient state.

20 Claims, 8 Drawing Sheets

(56) References Cited

U.S. PATENT DOCUMENTS

| | | | |
|---|---|---|---|
| 2013/0307503 A1 | 11/2013 | Ouyang et al. | |
| 2015/0002115 A1* | 1/2015 | Shenoy | H02M 3/1584 323/271 |
| 2016/0299520 A1 | 10/2016 | Mangina et al. | |

* cited by examiner

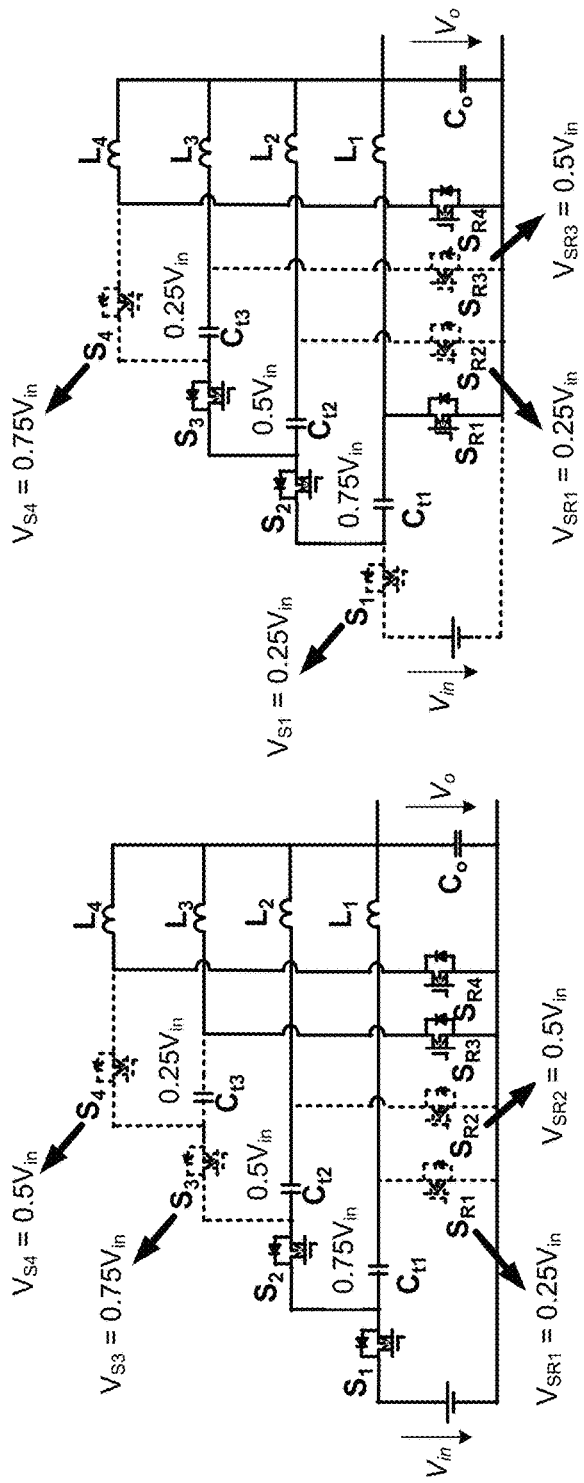
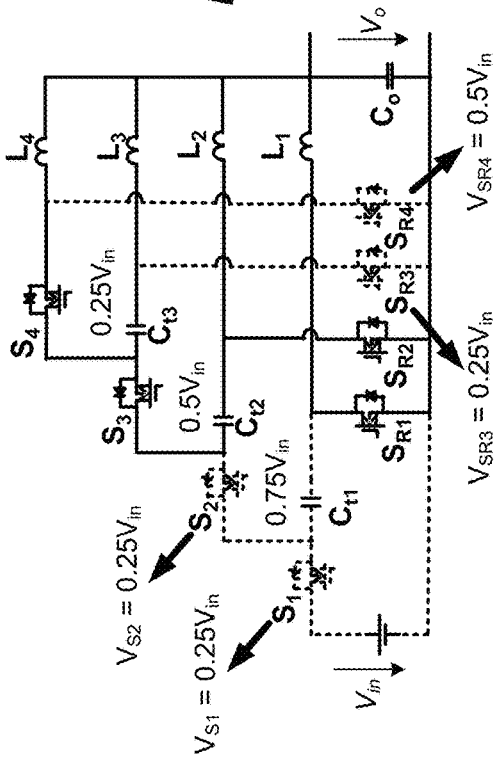
FIG. 4A
FIG. 4B
FIG. 4C

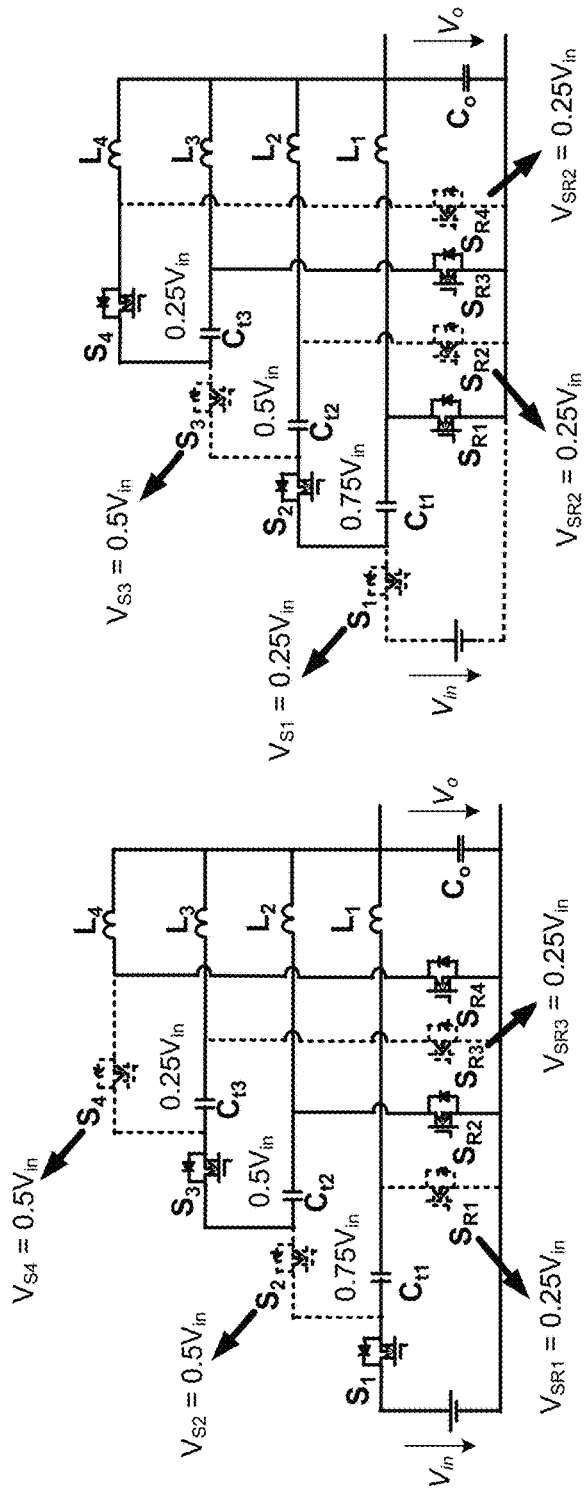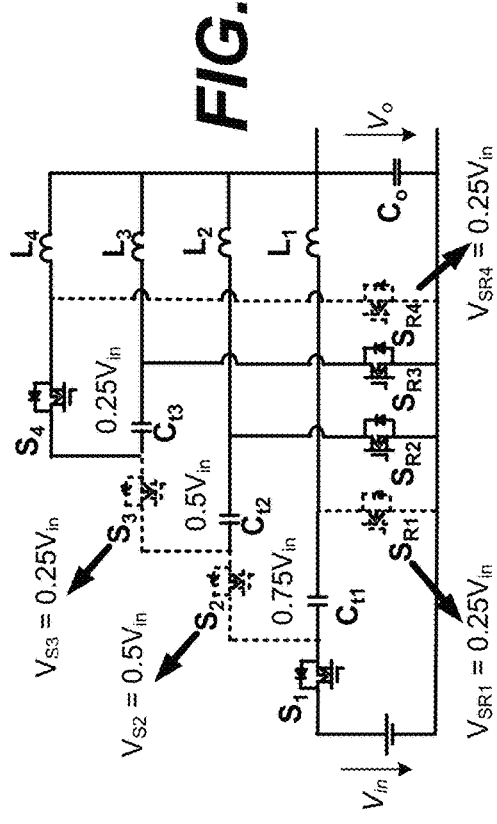
FIG. 6A
FIG. 6B
FIG. 6C

TRANSIENT CONTROL SCHEME FOR MULTIPHASE POWER CONVERTERS

BACKGROUND

Efficient power management solutions for data centers and telecom applications on both systematic and power converter levels are gaining attention due to the rapid increase of power consumption for these types of loads. Multiphase power converters, or multiphase voltage regulator modules (VRMs), such as a multiphase buck converter, can be used to handle demanding high current applications due to having higher efficiency ratings and lower dissipation losses. In comparison with single phase power converters, multiphase power converters can provide benefits such as reduced voltage ripple without increased switching losses and better transient response to output load changes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4A-4C illustrate schematics of a multiphase series capacitor buck converter with overlapping phases 1 and 2 during operation, with overlapping phases 2 and 3 during operation, and with overlapping phases 3 and 4 during operation, respectively, according to various embodiments described herein.

FIGS. 6A-6C illustrate schematics of a multiphase series capacitor buck converter with overlapping phases 1 and 3 during operation, with overlapping phases 2 and 4 during operation, and with overlapping phases 1 and 4 during operation, respectively, according to various embodiments described herein.

DETAILED DESCRIPTION

Figure 1:
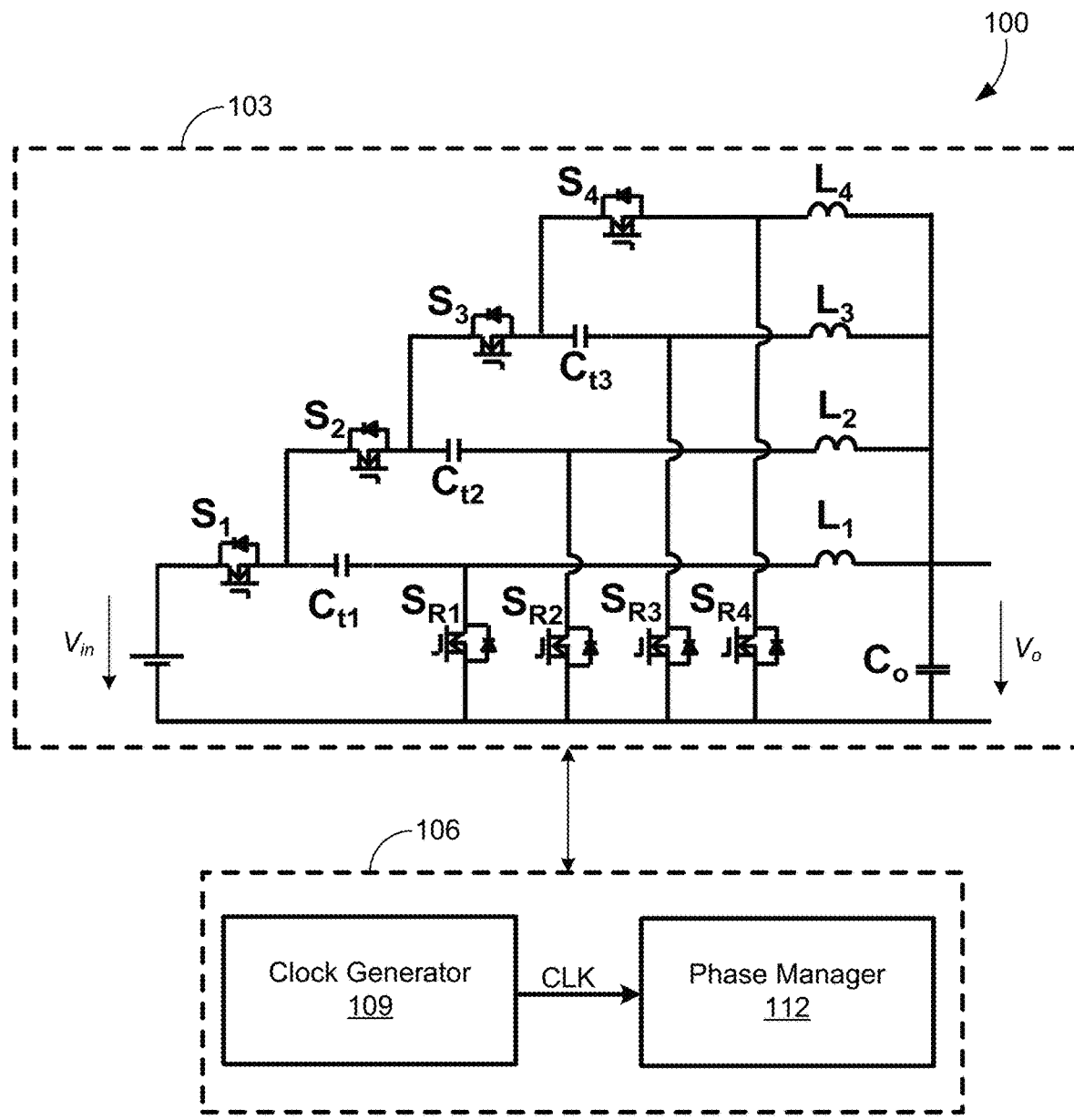
FIG. 1 illustrates an exemplary multiphase power converter system in accordance with various embodiments described herein.

With the ever-increasing speed and demand of electronic applications that are being implemented today, electronic circuits are designed with greater integration and smaller design features to increase efficiency and power handling loads. The efficiency of switching power converters is affected by the control of the modulation or switching signals that effectively control the on or off states of switching transistors of the power converter. The efficiency may further be affected by the nature of the operating conditions of the switching power converter, such as the connected load that may require high power draw for a short duration of time.

A multiphase power converter, such as a multiphase buck converter, is a parallel set of buck power stages, with each stage having its own inductor and a set of switching transistors. Collectively, each set of buck power stages and its components can be called a phase. To effectively handle the demand of applications today, multiphase buck converters are designed and implemented with various electronic circuits in industry today. As a voltage regulator module (VRM) and able to be used alongside, for example, central processing units (CPUs) in high current draw environments, VRMs such as a multiphase buck converter may need to operate with high efficiency and power density while meeting stringent transient specifications.

As the power demand increases, higher input voltage to the VRM, such as a 48V bus approach replacing the conventional 12V bus in data center applications, is required to increase the system efficiency. However, using a higher bus voltage raises several challenges for VRM design as the VRM is usually placed near the load, for example CPU. In such cases, the designed VRM must operate with high efficiency and power density while meeting stringent transient specifications. Using a conventional multiphase buck converter directly in higher voltage bus, such as a 48V bus, increases the device voltage stress, limits the on-time, and reduces the efficiency. A popular solution for the 48V bus approach incorporates a two-stage solution. The first stage is used to step-down a 48V to a lower bus voltage (e.g., 12V or 6V) with either a LLC resonant converter or a switched tank converter. However, these converters are unregulated converters, which could allow high efficiency and power density. The second stage is a multiphase buck converter that handles similar bus voltage as in the conventional 12V bus approach to achieve the voltage regulation to meet the stringent transient specifications.

In order to further improve efficiency and reduce number of devices, a single stage solution is preferred, however. For example, a hybrid switch capacitor converter, namely a four-phase series capacitor buck (SCB) converter, can be used as a single-stage 48V point-of-load (POL) VRM solution. The four-phase series capacitor buck converter has the same number of switches and magnetics as a four-phase buck converter with three additional series capacitors. In the four-phase series capacitor buck converter, the switching devices are switching at $0.25V_{in}$, and the applied voltage to all magnetics are also $0.25V_{in}$. High efficiency and power density may be achieved in 48V bus because the voltage stress and on-time is the same as multiphase buck converter in 12V bus approach while removing the first-stage power converter.

For a multiphase buck VRM, variable frequency controls are generally used to improve light-load efficiency, increase transient response speed, and reduce the amount of output capacitors by utilizing high-bandwidth designs. Constant on-time (COT) is a popular variable-frequency current control mode that achieves variable frequency by having a fixed on-time $T_{on}$. As the input voltage $V_{in}$ and output voltage $V_o$ varies, with a fixed $T_{on}$, the frequency naturally varies. The transient response of COT power converters may be largely dependent on the relative timing of a load transient and the constant duration periods during which power is drawn from the input power source.

For example, when a large decrease in load power occurs at or shortly after the onset of constant on-time pulse, the power converter current (e.g., inductor current) supplying power to the filter will continue to increase until the end of the power pulse causing load voltage overshoot. Conversely, if load power is transiently increased, the power converter response is limited by the constant on-time power pulses and the limitation by the maximum switching frequency available, generally causing load voltage undershoot. In conventional multiphase VRMs, such as a buck converter, simultaneously overlapping the on-time between phases can increase the transient speed at a sharp load power increase, alleviating the load voltage undershoot. However, randomly applying on-time overlap between phases in some multiphase power converters, such as hybrid switch capacitor converters, may increase the device voltage stress and inductor current oscillations. Thus, while hybrid switch capacitor converters are attractive for many applications, handling the transient response robustly has remained a challenge. Accordingly, aspects of the embodiments described herein include an improved transient control scheme for control of a multiphase power converter to achieve a faster transient response to output load changes without increasing voltage stresses placed on switching components.

In the context outlined above, a partial phase overlap transient control scheme for a multiphase power converter is proposed and described herein. In one example, a power converter system includes a multiphase power converter. The multiphase power converter includes a plurality of converter phases, with each converter phase comprising a switching transistor and an inductor coupled between an input power source and a load. The power converter system also includes a controller configured to distribute an on-time signal to each converter phase during operation of the multiphase power converter. The controller includes circuitry configured to enable an on-time signal phase overlap between non-subsequent phases of the multiphase power converter when a load current increase is detected during a transient state of the multiphase power converter. The on-time phase overlap refers to a simultaneous on-state of two or more switching transistors of the non-subsequent phases during a duration of time within the transient state.

Referring now to the drawings, FIG. 1 illustrates an example multiphase power converter system 100 in accordance with various embodiments described herein. The power converter system 100 includes the multiphase power converter 103 (also "power converter 103" or "converter 103") and a multiphase controller 106 ("controller 106"), among possibly other components. The power converter system 100 is illustrated as a representative example in FIG. 1, to explain the concepts of the embodiments described herein. The power converter system 100 is not exhaustively illustrated, and the power converter system 100 can include other components although not shown. Alternatively, one or more of the components of the converter system 100 shown in FIG. 1 can be omitted in some cases.

As illustrated, the multiphase power converter 103 includes a multiphase series capacitor buck converter in accordance with various embodiments described herein. The multiphase power converter 103 is shown to include four phases in FIG. 1, but the multiphase power converter 103 can include additional or fewer phases in some cases. While a multiphase series capacitor buck converter is illustrated in FIG. 1, the transient control scheme concepts described herein can be applied to related converter topologies. For example, aspects of the embodiments (e.g., the partial overlapping control schemes) can be applied to any known DC/DC, AC/DC, or DC/AC topology of multiphase power converter, such as buck converters, boost converters, flyback converters, buck-boost converters, and other converters.

The multiphase power converter 103 includes four phases or phase legs. The first phase includes switching transistors $S_1$ and $S_{R1}$, inductor $L_1$, and capacitor $C_{t1}$. The second phase includes switching transistors $S_2$ and $S_{R2}$, inductor $L_2$, and capacitor $C_{t2}$. The third phase includes switching transistors $S_3$ and $S_{R3}$, inductor $L_3$, and capacitor $C_{t3}$. The fourth phase includes switching transistors $S_4$ and $S_{R4}$ and inductor $L_4$. Each phase is coupled between an input power source having an input voltage $V_{in}$ and an output capacitor $C_o$ having an output voltage $V_o$.

More particularly, the drain of the transistor $S_1$ in the first phase is coupled to the input voltage $V_{in}$, a first side of the capacitor $C_{t1}$ in the first phase is coupled to the source of the transistor $S_1$, a second side of the capacitor $C_{t1}$ is coupled to a first end of the inductor $L_1$ in the first phase, and a second end of the inductor $L_1$ is coupled to the output capacitor $C_o$. The drain of the transistor $S_2$ in the second phase is coupled to the source of the transistor $S_1$ in the first phase, a first side of the capacitor $C_{t2}$ in the second phase is coupled to the source of the transistor $S_2$, a second side of the capacitor $C_{t2}$ is coupled to a first end of the inductor $L_2$ in the second phase, and a second end of the inductor $L_2$ is coupled to the output capacitor $C_o$. The drain of the transistor $S_3$ in the third phase is coupled to the source of the transistor $S_2$ in the second phase, a first side of the capacitor $C_{t3}$ in the third phase is coupled to the source of the transistor $S_3$, a second side of the capacitor $C_{t3}$ is coupled to a first end of the inductor $L_3$ in the third phase, and a second end of the inductor $L_3$ is coupled to the output capacitor $C_o$. Additionally, the drain of the transistor $S_4$ in the fourth phase is coupled to the source of the transistor $S_3$ in the third phase, a source of the transistor $S_4$ is coupled to a first end of the inductor La in the fourth phase, and a second end of the inductor La is coupled to the output capacitor $C_o$.

In the topology of the power converter 103 shown in FIG. 1, the second phase is subsequent to the first phase in the flow of charge from the input voltage $V_{in}$, the third phase is subsequent to the second phase in the flow of charge, and the fourth phase is subsequent to the third phase in the flow of charge. The second phase is subsequent to the first phase because the drain of the transistor $S_2$ is coupled between the source of the transistor $S_1$ and the capacitor $C_{t1}$ in the first phase. The third phase is subsequent to the second phase because the drain of the transistor $S_3$ is coupled between the source of the transistor $S_2$ and the capacitor Ct in the second phase. The fourth phase is subsequent to the third phase because the drain of the transistor $S_4$ is coupled between the source of the transistor $S_3$ and the capacitor $C_{t3}$ in the third phase. Thus, although the second phase is subsequent to the first phase, the third phase is not subsequent to (e.g., non-subsequent) the first phase. Similarly, although the third phase is subsequent to the second phase, the fourth phase is not subsequent to (e.g., non-subsequent) the second phase.

The switching transistors $S_{R1}$, $S_{R2}$, $S_{R3}$, and $S_{R4}$ are operated complementary to the switching transistors $S_1$, $S_2$, $S_3$, and $S_4$ such that, during operation, when the transistors $S_1$, $S_2$, $S_3$, and $S_4$ are driven in an on-state, the transistors $S_{R1}$, $S_{R2}$, $S_{R3}$, and $S_{R4}$ are driven in an off-state, and vice versa. In operation, the controller 106 is configured to control (e.g., to turn on or off) the phase legs of the power converter 103 individually. For example, the controller 106 is configured to turn on the first phase by switching transistor $S_1$ on and switching transistor $S_{R1}$ off. The controller 106 is also configured to turn off the first phase by switching transistor $S_1$ off and switching transistor $S_{R1}$ on. As another example, the controller 106 is configured to turn on the second phase by switching transistor $S_2$ on and switching transistor $S_{R2}$ off. The controller 106 is also configured to turn off the second phase by switching transistor $S_2$ off and switching transistor $S_{R2}$ on. Similarly, the controller 106 is configured to turn on the third phase by switching transistor $S_3$ on and switching transistor $S_{R3}$ off. The controller 106 is also configured to turn off the third phase by switching transistor $S_3$ off and switching transistor $S_{R3}$ on. Finally, the controller 106 is configured to turn on the fourth phase by switching transistor $S_4$ on and switching transistor $S_{R4}$ off, and configured to turn off the fourth phase by switching transistor $S_4$ off and switching transistor $S_{R4}$ on.

During steady state operation of the power converter 103, the controller 106 is configured, by the function of phase manager 112, to turn the phases of the power converter 103 on sequentially and respectively, with only one phase being turned on at a time. For example, in the steady state control scheme, the controller 106 is configured to turn on the second phase leg subsequent to (i.e., after) the first phase leg. The controller 106 is also configured to turn on the third phase leg subsequent to the second phase leg, to turn on the fourth phase leg subsequent to the third phase leg, and to turn on the first phase leg subsequent to the fourth phase leg. According to aspects of the embodiments, the controller 106 avoids turning on subsequent phases of the power converter 103 at the same time, because it results in voltages stress increase across the switching transistors in the subsequent phases. However, during at least some transient periods or states of high load for the power converter 103, the controller 106 is configured to turn on two non-subsequent phases (e.g., phases one and three, phases two and four, or phases one and four) of the power converter 103 at the same time as part of a transient control scheme. Additional aspects of the transient control scheme are described below.

The switching transistors in the power converter 103 can be embodied as any suitable type of semiconductor (or other) power switches, such as power bipolar transistors, power insulated gate bipolar transistors (IGBTs), power field effect transistors (FETS), or other types of switching transistors, depending upon the switching frequency of the converter 103, the input voltage $V_{in}$, the output voltage $V_o$, the power density of the converter 103, and other factors. However, certain semiconductor power switches, such as IGBTs, may not be suitable for use at higher speed switching frequencies. For higher speed switching operations according to aspects of the embodiments described herein, the switching transistors $S_1$, $S_2$, $S_3$, and $S_4$ and $S_{R1}$, $S_{R2}$, $S_{R3}$, and $S_{R4}$ can be embodied as metal oxide semiconductor field effect transistors (MOSFETs), such as silicon carbide (SiC) MOSFETs. Operation of the above-mentioned switching transistors is directed by the multiphase controller 106, which includes a clock generator 109 and a phase manager 112.

The clock generator 109 can be configured to generate a clock signal CLK. The clock signal CLK is provided as an input to the phase manager 112, as a timing control signal for distribution of a switching control signal to the switching transistors of each respective phase of the converter 103. The phase manager 112 is configured to sequentially distribute the clock signal CLK as an on-time signal or pulse to each phase of the converter 103, successively, which turns on a respective switching transistor for a respective phase. In some instances, none of the phases may be operating simultaneously. In another instance, such as a fast load increase event, the phase manager 112 can be configured to direct a phase overlap scheme of the controller 106, by simultaneously distributing an on-time signal or pulse to two or more phases at the same time. Such operation can result in simultaneous operation of two or more subsequent phases for a duration of time during transient state operation. In such a case, the two or more phases may be turned on or off at the same instances of time.

Furthermore, the phase manager 112 can be configured to direct a partial phase overlap scheme of the controller 106, by enabling phase overlap of non-subsequent phases of the converter 103, while preventing phase overlap of subsequent phases. The partial phase overlap scheme offers multiple benefits compared to the phase overlap scheme for conventional multiphase power converters, such as hybrid switch capacitor converters, including reduced device voltage stress, reduced device current stress, and avoidance of excessive inductor current oscillation.

The multiphase power converter 103 can operate similarly to a multiphase buck converter. For example, a multiphase buck converter includes multiple buck power stages connected in parallel, each with its own inductor and set of power MOSFETs that are coupled between an input power source and an output load. During steady-state operation, individual phases may be active at spaced intervals equal to 360°/N interleaving operation in a switching cycle with N being the total number of phases. In contrast to a four-phase buck converter, the four-phase series capacitor buck converter represented by the converter 103 includes three series capacitors $C_{t1}$, $C_{t3}$, and $C_{t3}$.

According to various embodiments described herein, the multiphase controller 106 can control the transient state operation of the converter 103 based on a COT control method using the clock generator 109 and the phase manager 112. In this respect, the controller 106 can control the transient state operation of the converter 103 with the partial phase overlap control scheme mentioned above to avoid increase in the device voltage stress among the respective switching transistors and other components. The partial phase overlap control allows for partial phase overlap during transient state operation of non-subsequent phases (e.g., phases 1 and 3, phases 1 and 4, phases 2 and 4, etc.) and prevents phase overlap of subsequent phases (e.g., phases 1 and 2, phases 2 and 3, phases 3 and 4, etc.). Although phase-overlap control is used to achieve faster transient response, phase-overlap between subsequent or adjacent phases is known to increase device voltage stress for various multiphase power converters.

The controller 106 can implement the partial phase overlap control scheme with the clock generator 109 and the phase manager 112 when a load current of the converter 103 is detected to have a rapid increase. For example, during transient state operation of the converter 103, the phase manager 112 can be configured to control the interleaving and simultaneous operation of the switches of the four phases of the converter 103 based on a clock signal generated by the clock generator 109. The clock generator 109 and the phase manager 112 include circuitry that can enable an on-time phase overlap between non-subsequent phases and prevent an on-time phase overlap between subsequent phases of the converter 103 when a load current increase is detected. An on-time phase overlap, as applied to the embodiments described herein, is a simultaneous on-state of two or more switching transistors of different phases of the converter 103 during transient state operation. However, in the partial phase overlap scheme, two or more non-subsequent phases may share a simultaneous on-state for a duration of time. Further, although sharing a simultaneous on-state for a duration of time, the two or more non-subsequent phases may not switch on or off at the same instances of time. Control operation of the converter 103, including the partial phase overlap control scheme, is discussed in greater detail with respect to the following figures.

Figure 2:
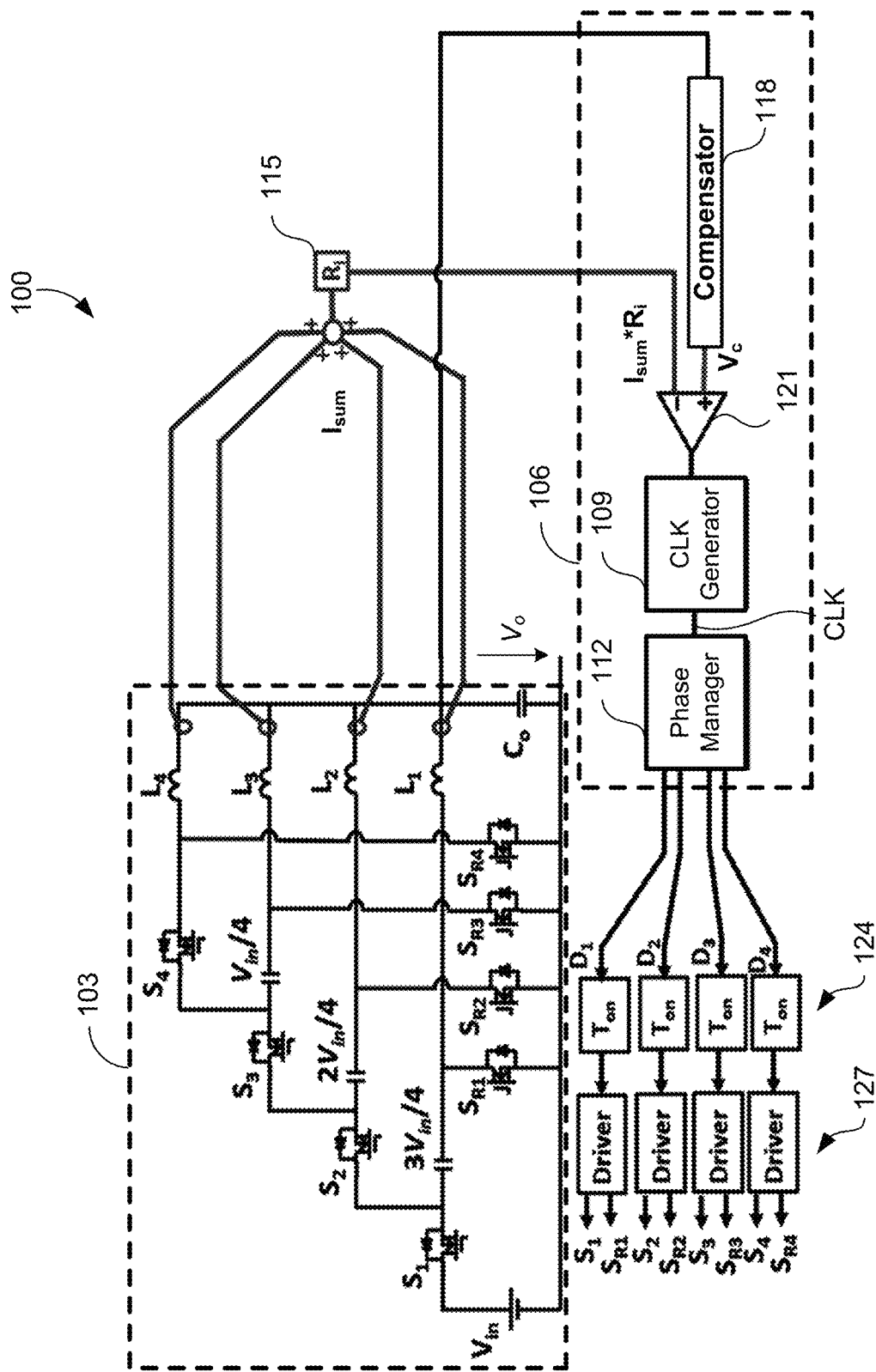
FIG. 2 illustrates a detailed circuit schematic diagram of the multiphase power converter system shown in FIG. 1 in accordance with various embodiments described herein.

FIG. 2 illustrates a detailed circuit schematic diagram of the multiphase power converter system 100 shown in FIG. 1 in accordance with various embodiments described herein. The multiphase power converter system 100 further includes a current sensing circuit 115, a compensator 118, a comparator circuit 121, on-time generators 124, and drivers 127. During operation, the controller 106 can implement a COT control scheme for steady and transient state operations of the power converter 103 based on a comparison of inputs to the comparator circuit 121. The inputs to the comparator circuit 121 include the sensed total inductor current $I_{sum}*R_i$ from the current sensing circuit 115 and a compensator voltage $V_c$ from the compensator 118, where $I_{sum}$ is the sum of all inductor currents of the power converter 103 during operation.

Figure 3:
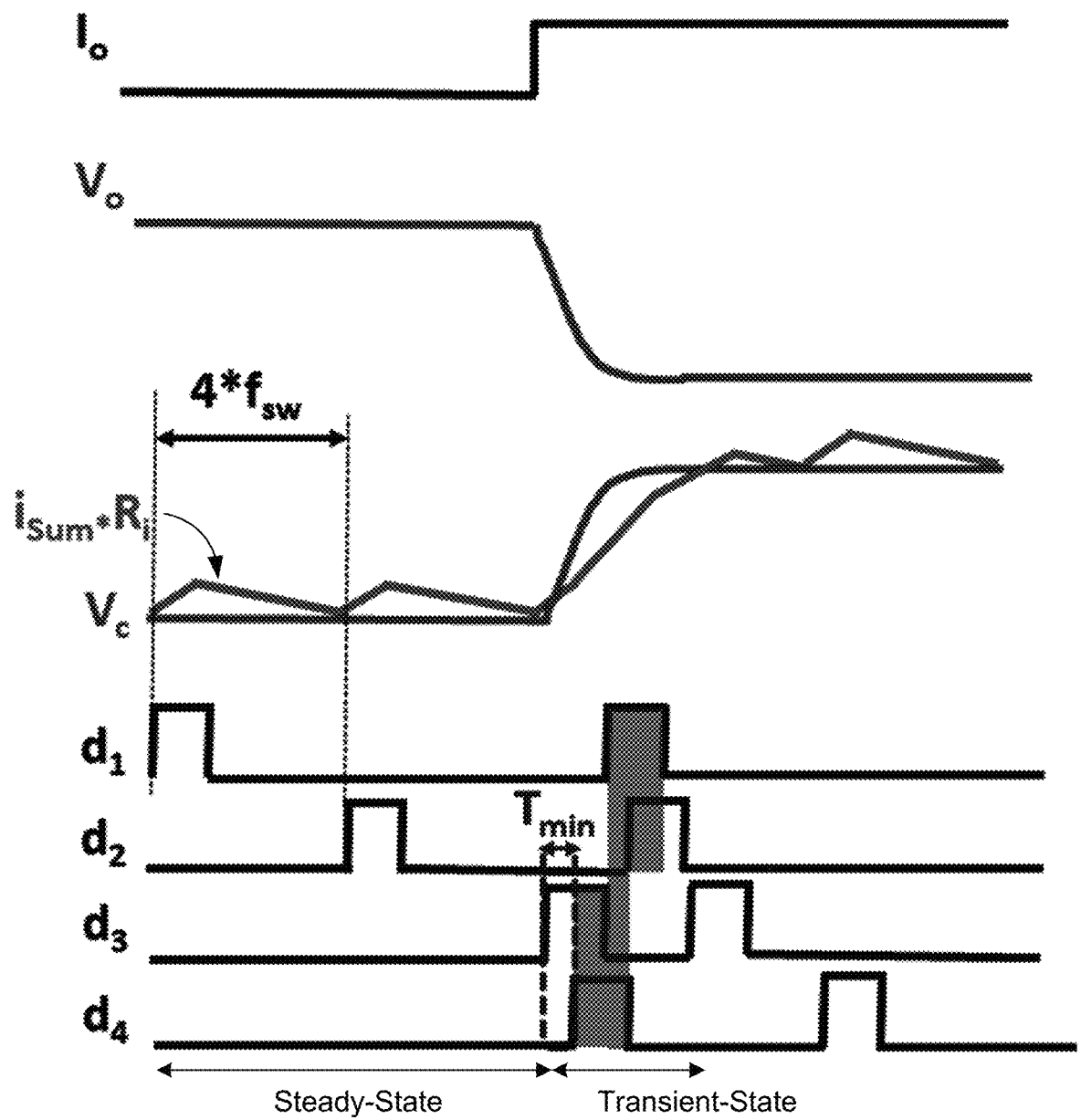
FIG. 3 illustrates an operational waveform of the multiphase converter shown in FIGS. 1 and 2 during steady and transient states of operation without implementation of the partial on-time ($T_{on}$) phase overlapping scheme according to various embodiments described herein.

FIG. 3 illustrates an operational waveform of the converter 103 during steady and transient states of operation without implementation of the partial on-time $T_{on}$ phase overlapping scheme according to various embodiments described herein. At steady state (e.g., when $I_{sum}*R_i$ is greater than or equal to $V_c$), the clock generator 109 generates a pulse of the clock signal CLK when the valley of $I_{sum}*R_i$ reaches (i.e., intersects with) $V_c$. The generated clock signal is delivered from the clock generator 109 to the phase manager 112. The phase manager 112 is configured to distribute the clock signal CLK to each of the on-time generators 124 in sequence (e.g., first CLK signal to phase 1, second CLK signal to phase 2, third CLK signal to phase 3, and fourth CLK signal to phase 4) to trigger a sequence of on-time signals for turning on respective phases of the converter 103. The on-time generators 124 are configured to generate the on-time signals that can be sent to the drivers 127 for switching on a respective transistor for each phase in sequence. For a N-phase power converter, this interleaving operation can be achieved because the period of the $I_{sum}*R_i$ valley is given by $T_s/N$, which results in 360°/N interleaving operation.

In steady state operation, the converter may operate without phase overlap, as shown in FIG. 3, and the phases are turned on one by one in sequence. Referring to FIG. 3, during phase 1 in an on state, the $S_1$, $S_{R2}$, $S_{R3}$, and $S_{R4}$ switches are driven to an on state, while other switches are driven to an off state. The voltage stress of $S_2$ is $0.5V_{in}$ while other off state switches are $0.25V_{in}$. All of the on state switches handle their respective phase inductor current. During phase 2 in an on state, the $S_2$, $S_{R1}$, $S_{R3}$, and $S_{R4}$ switches are driven to an on state, while other switches are driven to an off state. The voltage stress of $S_3$ is $0.5V_{in}$ while other off state switches are $0.25V_{in}$. The switch $S_{R1}$ handles inductor current of phase 1 and phase 2, while other on state switches handle their respective phase inductor current. During phase 3 in an on state, the $S_3$, $S_{R1}$, $S_{R2}$, and $S_{R4}$ are driven to an on state, while other switches are driven to an off state. The voltage stress of $S_4$ is $0.5V_{in}$ while other off state switches are $0.25V_{in}$. The switch $S_{R2}$ handles inductor currents of phase 2 and phase 3, while other on state switches handle their respective phase inductor current. During phase 4 in an on state, the $S_4$, $S_{R1}$, $S_{R2}$, and $S_{R3}$ are driven to an on state, while other switches are driven to an off state. The voltage stress of all off state switches are $0.25V_{in}$. The switch $S_{R3}$ handle inductor current of phase 3 and phase 4, while other on state switches handle their respective phase inductor current.

Referring to FIG. 3, at load step-up transient with a high current slew rate, the sensed total inductor current $I_{sum}*R_i$ falls and remains below the compensator voltage $V_c$, which can saturate the comparator circuit 121. When the comparator circuit 121 is saturated, the clock generator 109 can generate a clock signal with a predetermined period $T_{min}$ between each clock signal. The predetermined period $T_{min}$ is designed to allow phase overlap between on-times $T_{on}$ of each phase in order to increase the current slew rate, which can improve the load step-up transient speed. If the predetermined period $T_{min}$ is designed to be smaller than the on-time $T_{on}$, phase overlap between phases can occur.

For example, pulses $d_1$-$d_4$ illustrate the on-time signals that have been triggered by the phase manager 112 and delivered to respective phases of the converter 103 by the drivers 127 within a time period. During transient state operation, the controller 106 can be configured to simultaneously turn on some of the phases by switching on respective transistors of the converter 103 for a short duration of time. For example, phases 1 and 2 are both simultaneously enabled for a short duration of time, and phases 3 and 4 are both simultaneously enabled for a short duration of time. However, this phase overlapping mode, which allows phase overlap between subsequent phases, can increase device voltage stress and current stress, and is discussed further with respect to FIGS. 4-6.

FIG. 4A illustrates a schematic of an example multiphase series capacitor buck converter with phases 1 and 2 turned on in an overlapping state during operation, where the dashed line shows the non-conducting path and the solid line shows the conducting path. FIGS. 4B and 4C illustrate the example multiphase series capacitor buck converter with overlapping phases 2 and 3, and 3 and 4 during operation, respectively. When the on-time $T_{on}$ of phase 1 and phase 2 are overlapped, $S_1$ and $S_2$ are turned-on, which by Kirchoff's Voltage Law (KVL), $V_{SR2}=0.5V_{in}$ and $V_{S3}=0.75V_{in}$, which both are higher than their steady-state values, as shown in FIG. 4A. Moreover, with Kirchoff's Current Law (KCL) now S1 should handle inductor currents of phases 1 and 2, which are also higher than the steady-state values. The KVL and KCL analysis can be performed for phase overlaps between phases 2 and 3, and phases 3 and 4, which both also increase the switching device voltage and current stresses compared to the steady-state operation. To alleviate the high device voltage stress concerns, the predetermined period $T_{min}$ can be designed to be equal or larger than the on-time $T_{on}$ in some cases, which will prevent phase overlap between phases at load step-up transient. However, non-overlapping operation at load step-up transient can make the transient speed slower for multiphase power converters and may cause undesirable output voltage undershoot.

Figure 5:
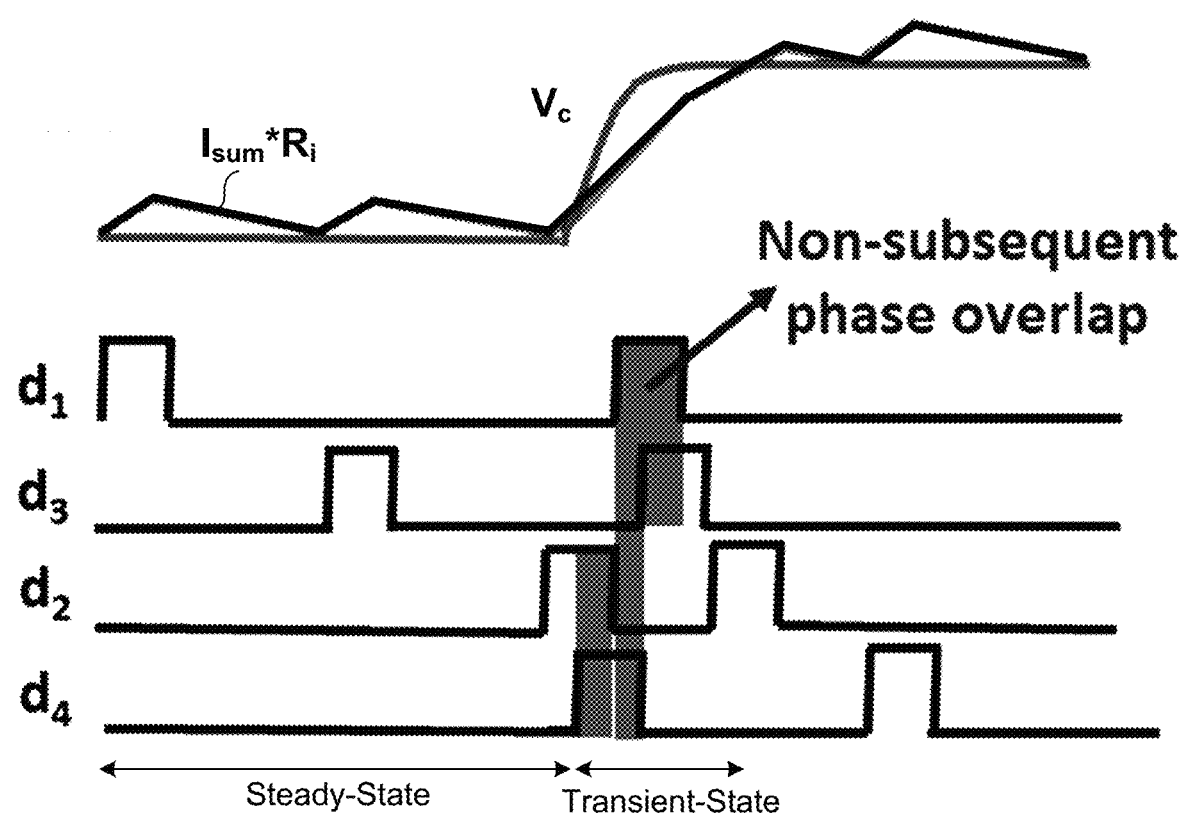
FIG. 5 illustrates an operating waveform of the multiphase power converter shown in FIGS. 1 and 2 with implementation of a partial on-time phase overlapping scheme according to various embodiments described herein.

FIG. 5 illustrates an operating waveform of the power converter 103 shown in FIG. 1 with implementation of the partial phase overlapping scheme according to various embodiments described herein. As discussed above, on-time $T_{on}$ phase overlap between subsequent phases may not be desired in some instances, as it can increase switching device voltage and current stress. However, partial on-time $T_{on}$ phase overlap between non-subsequent phases (e.g., phases 1 and 3, phases 1 and 4, phases 2 and 4, etc.) will not increase switching device voltage stresses of the converter 103. For example, during transient state operation, the sensed total inductor current $I_{sum}*R_i$ can fall below the compensator voltage $V_c$ as shown in FIG. 5. The pulses $d_1$-$d_4$, which indicate on-time signals that have been triggered for respective phases of the converter 103, do not have any overlapping operation between subsequent phases. However, overlapping operation still occurs with respect to non-subsequent phases, such as phases 1 and 3, phases 1 and 4, and phases 2 and 4, as shown in FIG. 5. Thus, a higher current $i_{sum}$ slew rate can be achieved with implementation of the partial on-time $T_{on}$ phase overlapping scheme.

FIG. 6A illustrates a schematic of an example multiphase series capacitor buck converter with phases 1 and 3 turned on in an overlapping state during operation. FIGS. 6B and 6C illustrate the example multiphase series capacitor buck converter with overlapping phases 2 and 4, and with overlapping phases 1 and 4 during operation, respectively. When the on-time $T_{on}$ of phase 1 and phase 3 are overlapped, $S_1$ and $S_3$ are turned-on, which by Kirchoff's Voltage Law (KVL), $V_{S2}=V_{S4}=0.5V_{in}$, $V_{SR1}=V_{SR3}=0.25V_{in}$, which are the same as their steady-state values, as shown in FIG. 6A. Moreover, with Kirchoff's Current Law (KCL) now $S_{R1}$ and $S_{R3}$ should handle inductor currents of phases 1 and 2, and phases 3 and 4, respectively, which are also the same as the steady-state values. The KVL and KCL analysis can be performed for phase overlaps between phases 2 and 4, and phases 1 and 4, which both also have the same switching device voltage and current stresses as in the steady-state operation. According to aspects of the embodiments, the controller 106 can enable the partial on-time $T_{on}$ phase overlap control scheme by changing the clock signal distribution sequence within the phase manager 112 and through the addition of partial-overlap logic circuitry to the clock generator 109.

Figure 7:
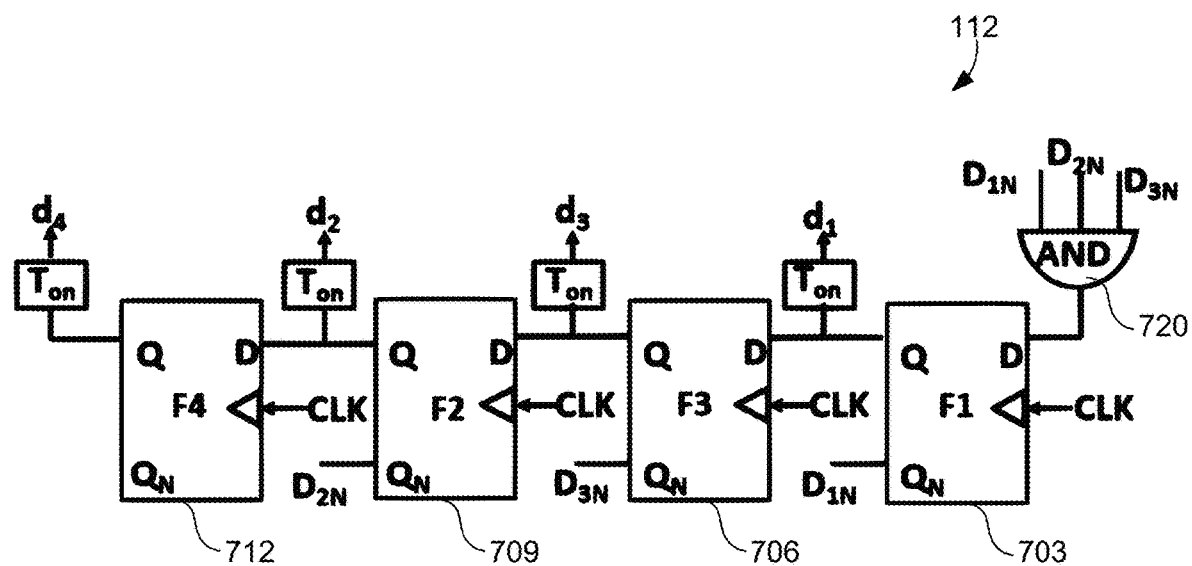
FIG. 7 illustrates a circuit schematic diagram of a phase manager of the multiphase controller shown in FIGS. 1 and 2 with a modified phase distribution sequence according to various embodiments described herein.

FIG. 7 illustrates a circuit schematic of the phase manager 112 in accordance with various embodiments described herein. The phase manager 112 includes flip-flop circuits 703, 706, 709, and 712 to handle distribution of the generated clock signal to each respective phase of the converter 103. As illustrated, four flip-flop circuits are coupled together, corresponding to the number of phases of the converter 103. For instance, the converter 103 can be extended to N phases and the phase manager 112 can be extended to include N cascading flip flops corresponding with the N phases, with N being an integer greater than 2.

At the beginning of transient state operation, inputs $D_{1N}$, $D_{2N}$, and $D_{3N}$ are in a high state and are fed as inputs to an AND logic gate. The output of the AND logic gate 720 is connected to the D input terminal of the flip flop circuit 703, which results in the D terminal of the flip-flop circuit 703 being in a high state. Thus, when there is a CLK signal sent by the clock generator 109, output Q of the flip-flop circuit 703 will be in a high state and inverse output $Q_N$ would be in a low state, which would trigger an on-time signal to be delivered to phase 1 of the converter 103. In order to enable the partial phase overlapping scheme for non-subsequent phases of the converter 103, the phase manager 112 incorporates a proposed distribution sequence of the clock signal to the respective phases.

Instead of the clock signals being distributed sequentially to subsequent phases, the phase manager 112 is configured to turn on phase 3 after phase 1 is turned on in this example. After phase 1 is turned on as described above, the phase manager 112 is configured to distribute the next clock signal to turn on phase 3, which can enable simultaneous operation of phases 1 and 3 during transient state operation. The phase manager 112 can then be configured to turn on phase 2 and then phase 4 based on subsequent clock signals, which can enable simultaneous operation of phases 2 and 4 during transient state operation. Next, the phase manager 112 can further be configured to turn on phases 4 and 1 to enable simultaneous operation of phases 4 and 1 during transient state operation. In this example, the odd phases are turned on first before the even phases are turned on. However, the phase manager 112 can implement even phases being turned on before odd phases and other non-subsequent sequences as can be appreciated, and can be extended to N phases.

The partial phase overlapping that can occur between non-subsequent phases can occur without going through subsequent phase overlap, thereby avoiding device voltage stress increase and current stress increase. In various embodiments, the proposed clock signal distribution sequence of the phase manager 112 enables the partial phase overlap control scheme. Although non-subsequent phases may be simultaneously in an on-state for a duration of time during transient state operation, the non-subsequent phases are not actually turned on simultaneously in some cases as shown in the operating waveform of FIG. 5. For instance, phases 1 and 3 share partial phase overlap and are in an on-state simultaneously for a duration of time, but they are not turned on or off simultaneously at the same instance of time. The phase manager 112 can be configured to enable partial phase overlap between non-subsequent phases without allowing subsequent phase overlap.

Figure 8:
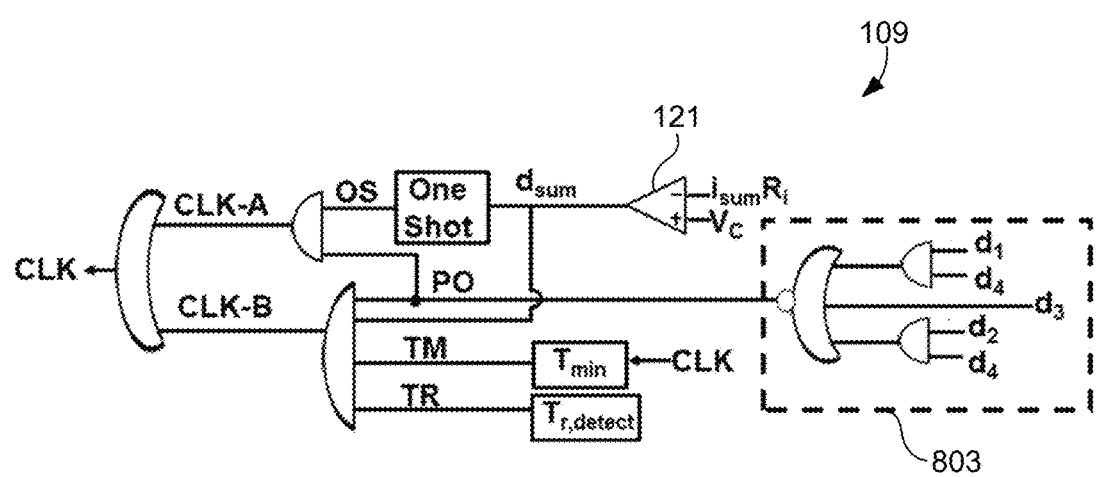
FIG. 8 illustrates a circuit schematic diagram of a clock generator of the multiphase controller shown in FIGS. 1 and 2 according to various embodiments described herein.

FIG. 8 illustrates a circuit schematic diagram of the clock generator 109 of the multiphase controller 103 according to various embodiments described herein. To prevent further phase overlap between subsequent phases, the clock generator 109 includes the partial-overlap logic circuitry 803. The partial-overlap logic circuitry 803 is illustrated as a representative example in FIG. 8. The partial-overlap logic circuitry 803 is configured to enable an on-time signal partial phase overlap between non-subsequent phases of the power converter 106, as described herein. However, the partial-overlap logic circuitry 803 can be implemented to enable an on-time signal partial phase overlap using other circuit configurations.

The partial-overlap logic circuitry 803 includes an arrangement of logic gate circuits that determine the clock signal to be generated and sent to the phase manager 112 based on a set of logic conditions. Inputs to the partial-overlap logic circuitry 803 can include feedback from the outputs of the flip-flop circuits 703, 706, 709, and 712, for example, which determine which on-time signals ($d_1$-$d_4$) have been triggered for respective phases of the converter 103. Based on the feedback, the partial-overlap logic circuitry 803 can determine which phases are currently turned on and prevent the clock generator 109 from generating a clock signal if the next phase in the sequence to be turned on is subsequent to a phase that is already in an on state. The partial-overlap logic circuitry 803 can be configured to prevent signal TM ($T_{min}$) from determining CLK-B, which can cause the CLK signal to be sent to the phase manager 112 in step up transient when the comparator clock signal CLK-A is saturated at a high value. If the $d_3$, da and $d_1$, or the $d_2$ and de signals are high, the NOR gate will give a low PO signal and prevent signal TM from determining CLK-B and signal OS from determining CLK-A. Operation of the clock generator 109 is discussed in detail with respect to FIG. 9.

Figure 9:
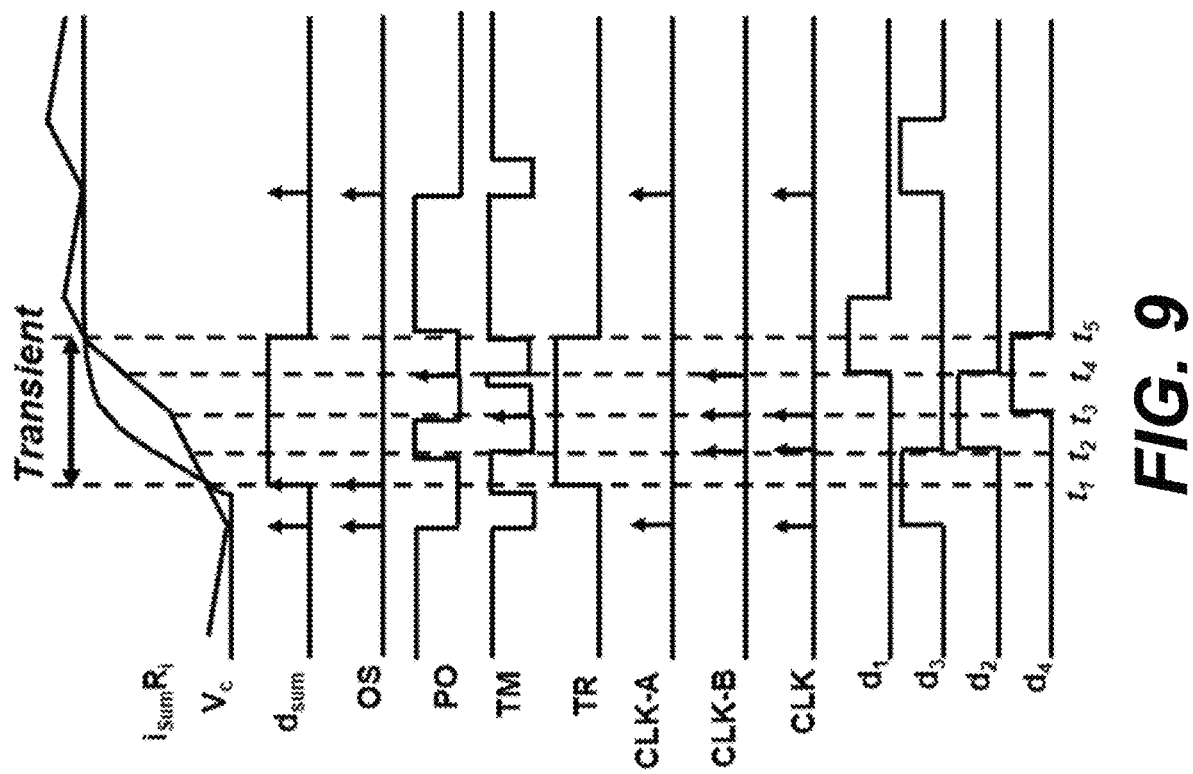
FIG. 9 illustrates a clock diagram operating waveform of the clock generator shown in FIG. 8 according to various embodiments described herein.

FIG. 9 illustrates a clock diagram operating waveform of the clock generator 109. For time periods $t_1$-$t_2$ in step-up transient operation, the compensator voltage $V_c$ is larger than the sensed total inductor current $I_{sum}*R_i$, which saturates the comparator circuit 121, causing $d_{sum}$ to be high and initiating signal OS to make CLK-A high. However, $d_3$ is already in high state at $t_1$, while the NOR gate output signal PO is at a low state. Because CLK-A is determined by AND gate from OS and PO signals, the CLK-A signal stays at low state despite the high state of OS signal. Therefore, CLK signal through OR gate from CLK-A stays at a low value and prevents $d_2$ from switching to a high state that may cause undesirable subsequent phase overlap between phases 2 and 3 based on the distribution sequence illustrated in FIG. 7.

At $t_1$, the TM signal, determined by predetermined $T_{min}$ and reset by the CLK signal, is already at a high state, and the TR signal from a transient detection circuitry, $T_{r,detect}$, is also already at high state. Both the TM and TR signals can initiate CLK-B to a high state value and may initiate the CLK signal to be high. However, CLK-B is prevented from changing to a high state because CLK-B is determined by three signals, TM, TR, and PO, through the AND gate (FIG. 8), and the PO signal is at a low state due to $d_3$ being at a high state, causing the PO signal from partial phase overlap logic being in a low state. Again, the partial phase overlap logic prevents $d_2$ from switching to a high state that may cause undesirable subsequent phase overlap between phases 2 and 3. During transient state, the $d_{sum}$ signal is saturated at a high state and causes the OS signal, and eventually CLK-A, to stop operating until the transient state is finished. There is no change of state until $t_2$, where $d_3$ is low.

During $t_2$-$t_3$, when $d_3$ switches to a low state at $t_2$, de switches to a high state, which is initiated by the CLK signal when CLK-B signal switches to a high state. The CLK-B signal is able to switch to the high state because the TM and TR signals are already at a high state, and the PO signal switches to high state because the $d_3$ switches to a low state causing the NOR gate (FIG. 8) to give PO a high state signal. During $t_2$-$t_3$, the PO signal stays at the high state because only $d_2$ is at the high state following the operation of the partial-overlap logic. The CLK signal will reset the $T_{min}$ and cause the TM signal to switch back to a low state. After $T_{min}$ period, the TM signal switches to a high state causing $d_4$ to switch to a high state at $t_3$, because the TM, TR, and PO signals are at a high state and enable overlap between $d_2$ and $d_4$ (phases 2 and 4). Because the $d_2$ and $d_4$ signals are high, the NOR gate output signal, the PO signal, is low, which causes the CLK-B signal to stay low even if the TM signal is already in a high state within the $t_3$-$t_4$ period, which prevents phase overlap between $d_2$ and $d_1$.

During $t_4$-$t_3$, when $d_2$ switches to a low state at $t_4$, the PO signal and $d_1$ switch back to a high state, causing partial phase overlap between $d_1$ and $d_4$. Since $d_1$ and da are in a high state, the NOR gate (FIG. 8) output signal is low. Therefore, even if the signal TM is high, CLK-B is still low and prevents overlap between $d_3$ and $d_4$. When $d_4$ switches to a low state at $t_3$, the NOR gate (FIG. 8) output signal will switch to high, which would cause CLK-B switch to high. At $t_3$ the transient state is finished, which makes the TR and $d_{sum}$ signals switch to a low state. Therefore, the CLK-B signal will be kept at a low state despite the changes in the PO and TM signals. After $t_3$, the CLK-A signal will be determined by the CLK signal as it is already back to steady-state operation.

The embodiments described herein can enable partial phase overlap control in the context of multiphase power converters, which can allow partial phase overlap for non-subsequent phases during transient-state operation. The partial phase overlap control offers benefits over conventional overlap control methods such as avoiding device voltage and current stress increase while keeping fast transient operation.

The components described herein, including the multi-phase controller 106, can be embodied in the form of hardware, firmware, software executable by hardware, or as any combination thereof. If embodied as hardware, the components described herein can be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs)), or complex programmable logic devices (CPLDs)), among other types of processing circuitry.

The microprocessors, microcontrollers, or DSPs, for example, can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The features, structures, and components described herein may be combined in one or more embodiments in any suitable manner, and the features discussed in the various embodiments are interchangeable in many cases. When two components are described as being "coupled to" each other, the components can be electrically coupled to each other, with or without other components being electrically coupled and intervening between them. When two components are described as being "directly coupled to" each other, the components can be electrically coupled to each other, without other components being electrically coupled between them.

Terms such as "a," "an," "the," and "said" are used to indicate the presence of one or more elements and components. The terms "comprise," "include," "have," "contain," and their variants are used to be open ended and may include or encompass additional elements, components, etc., in addition to the listed elements, components, etc., unless otherwise specified. The terms "first," "second," etc. are used only as labels, rather than a limitation for a number of the objects.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A power converter system, comprising:
a multiphase power converter comprising a plurality of converter phases, each converter phase comprising a switching transistor and an inductor coupled between an input power source and a load; and
a controller configured to distribute an on-time signal to each converter phase during operation of the multiphase power converter, the controller comprising circuitry configured to enable an on-time signal phase overlap between non-subsequent phases of the multiphase power converter when a load current increase is detected during a transient state of the multiphase power converter, the on-time signal phase overlap being a simultaneous on-state of two or more switching transistors of the non-subsequent phases during a duration of time within the transient state.

2. The power converter system of claim 1, wherein the plurality of converter phases comprises four converter phases.

3. The power converter system of claim 1, wherein the multiphase power converter comprises a multiphase series capacitor buck power converter.

4. The power converter system of claim 1, wherein:
the controller comprises a clock generator and a comparator circuit; and
the comparator circuit is configured to receive a sensed total inductor current of the plurality of converter phases and a compensator voltage from a compensator coupled to the load.

5. The power converter system of claim 4, wherein the comparator circuit is configured to compare the compensator voltage and the sensed total inductor current of the plurality of converter phases to generate a comparator clock signal input for the clock generator.

6. The power converter system of claim 5, wherein:
the controller further comprises a phase manager configured to receive a clock signal from the clock generator; and
the phase manager is configured to trigger a plurality of on-time signals for turning on the plurality of converter phases during the transient state based on the clock signal, the plurality of on-time signals being triggered successively in a non-subsequent sequence of the plurality of converter phases.

7. The power converter system of claim 6, wherein the non-subsequent sequence comprises turning on even or odd phases of the multiphase power converter first during the transient state operation.

8. The power converter system of claim 6, wherein triggering the plurality of on-time signals comprises turning on two or more non-subsequent phases of the multiphase power converter to share the on-time signal phase overlap during the duration of time.

9. The power converter system of claim 6, wherein the phase manager comprises a plurality of logic circuits coupled together for generating the plurality of on-time signals and receiving the clock signal, the plurality of logic circuits comprising a plurality of flip-flop circuits.

10. The power converter system of claim 4, wherein:
the clock generator comprises partial-overlap logic circuitry; and
the partial-overlap logic circuitry is configured to prevent the on-time signal phase overlap between subsequent phases of the multiphase power converter based on a set of logic conditions.

11. The power converter system of claim 10, wherein the controller is configured to successively distribute the on-time signal to each converter phase during the transient state operation in a non-subsequent sequence, the set of logic conditions determining whether a next phase to be turned on among the plurality of converter phases is a non-subsequent phase of a phase that is already in an on-state.

12. A power converter system, comprising:
a multiphase power converter comprising a plurality of converter phases, each converter phase comprising a switching transistor and an inductor coupled between an input power source and a load; and
a controller configured to distribute an on-time signal to each converter phase during operation of the multiphase power converter, the controller comprising circuitry configured to enable an on-time signal phase overlap between non-subsequent phases of the multiphase power converter when a load current increase is detected during a transient state of the multiphase power converter, the on-time signal phase overlap being a simultaneous on-state of two or more switching transistors of the non-subsequent phases during a duration of time within the transient state,
wherein the controller comprises a clock generator and a comparator circuit, the comparator circuit being configured to receive a sensed total inductor current of the plurality of converter phases and a compensator voltage from a compensator coupled to the load, the comparator circuit being configured to compare the compensator voltage and the sensed total inductor current to generate a comparator clock signal input for the clock generator.

13. The power converter system of claim 12, wherein the multiphase power converter comprises a multiphase series capacitor buck power converter.

14. The power converter system of claim 12, wherein the controller further comprises a phase manager configured to receive a clock signal from the clock generator, the phase manager being configured to trigger a plurality of on-time signals for turning on the plurality of converter phases during the transient state based on the clock signal, the plurality of on-time signals being triggered successively in a non-subsequent sequence of the plurality of converter phases.

15. The power converter system of claim 14, wherein the non-subsequent sequence comprises turning on even or odd phases of the multiphase power converter first during the transient state operation.

16. The power converter system of claim 14, wherein triggering the plurality of on-time signals comprises turning on two or more non-subsequent phases of the multiphase power converter to share the on-time signal phase overlap during the duration of time.

17. The power converter system of claim 16, wherein the phase manager comprises a plurality of logic circuits coupled together for generating the plurality of on-time signals and receiving the clock signal, the plurality of logic circuits comprising a plurality of flip-flop circuits.

18. A power converter system, comprising:
a multiphase power converter comprising a plurality of converter phases, each converter phase comprising a switching transistor and an inductor coupled between an input power source and a load; and a controller configured to distribute an on-time signal to each converter phase during operation of the multiphase power converter, the controller comprising circuitry configured to enable an on-time signal phase overlap between non-subsequent phases of the multiphase power converter when a load current increase is detected during a transient state of the multiphase power converter, the on-time signal phase overlap being a simultaneous on-state of two or more switching transistors of the non-subsequent phases during a duration of time within the transient state, wherein the controller comprises a phase manager and a clock generator, the phase manager configured to receive a clock signal from the clock generator, the phase manager being configured to trigger a plurality of on-time signals for turning on the plurality of converter phases during the transient state based on the clock signal, the plurality of on-time signals being triggered successively in a non-subsequent sequence of the plurality of converter phases.

19. The power converter system of claim 18, wherein triggering the plurality of on-time signals comprises turning on two or more non-subsequent phases of the multiphase power converter to share the on-time signal phase overlap during the duration of time.

20. The power converter system of claim 18, wherein the clock generator comprises partial-overlap logic circuitry, the partial-overlap logic circuitry being configured to prevent the on-time signal phase overlap between subsequent phases of the multiphase power converter based on a set of logic conditions.

\* \* \* \* \*